Feb. 8, 1949.　　　V. K. FROWINE　　　2,461,207
MANDIBULAR CAST POSITIONER
Filed Sept. 28, 1945　　　2 Sheets-Sheet 2
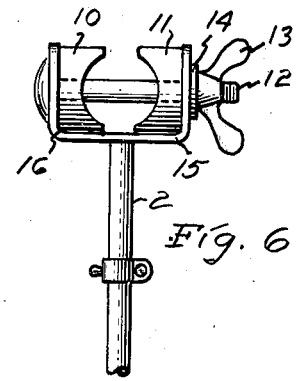
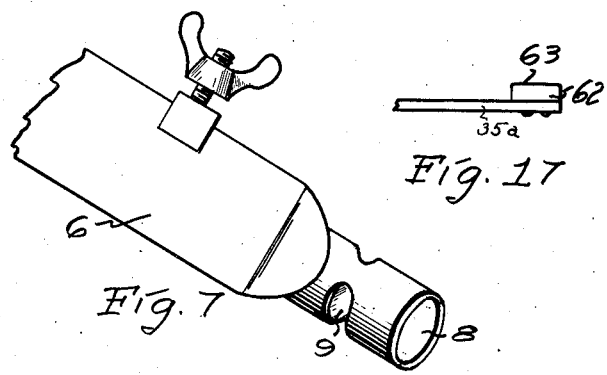
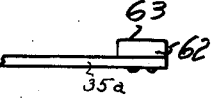
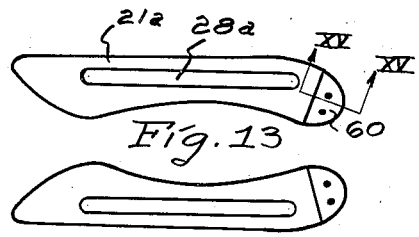
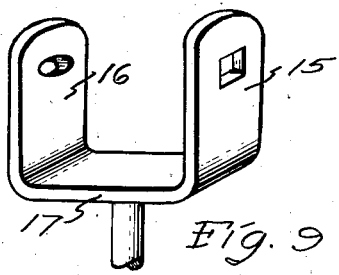
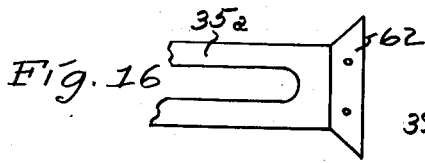
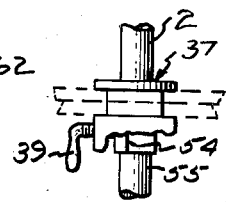
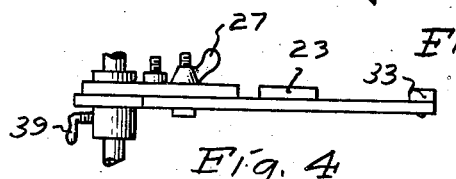
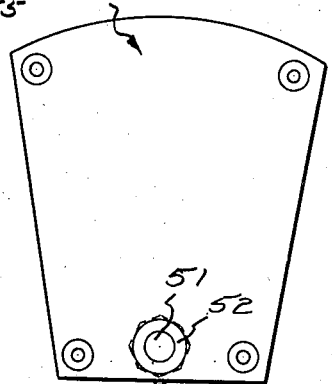
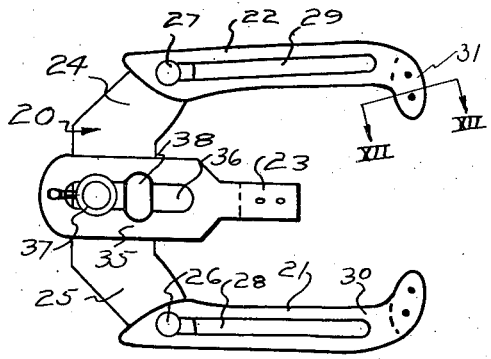
INVENTOR
VON K. FROWINE
ATTORNEY Patented Feb. 8, 1949

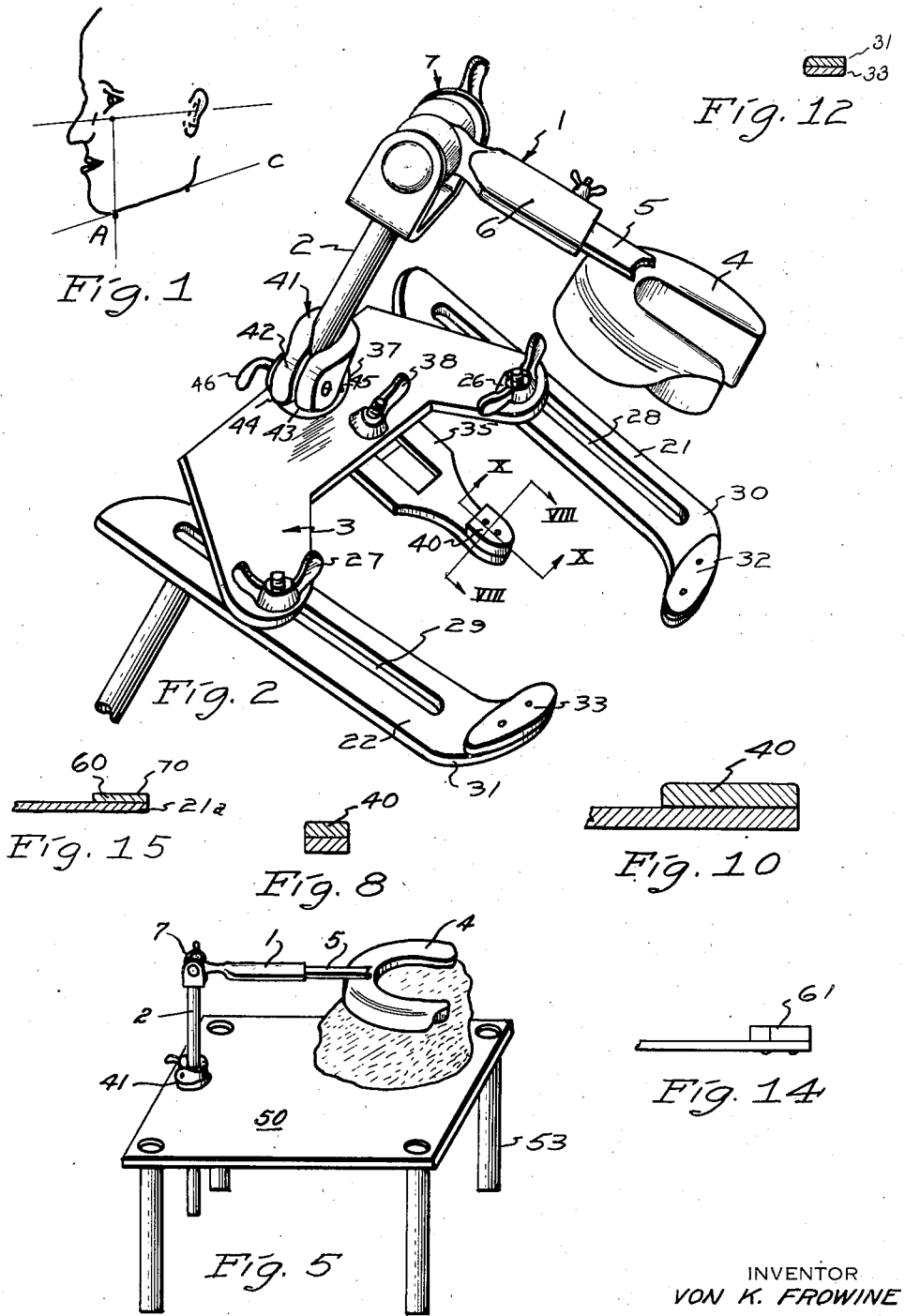

2,461,207

UNITED STATES PATENT OFFICE 2,461,207

MANDIBULAR CAST POSITIONER

Von K. Frowine, Kalamazoo, Mich.

Application September 28, 1945, Serial No. 619,199

3 Claims. (Cl. 32—19)

This invention refers to a dental method and equipment and particularly to a type thereof utilized in making plaster denture reproductions.

There has recently been introduced into the art under the name of "gnathostatics" a method of procedure and equipment for measuring the position of a patient's dentures with respect to a selected plane for the purpose of taking measurements bearing upon dental and particularly orthodontic procedures. By this method the practice has been to take such measurements with respect to a plane determined by the patient's eyes and ears known as the "Frankfort" or the "eye-ear" plane, or with respect to "orbital" plane which is a plane perpendicular to the Frankfort plane through the eye points of determination. Several types of equipment have been proposed and produced utilizing these planes, and many improvements over the originally proposed equipment have been made to minimize certain disadvantages which were present in the beginning. However, none of this equipment, or methods of utilization thereof, have been able to avoid the fact that the use of the "eye-ear" plane itself introduce a number of uncertainties into the measurements, which from the very nature of the reference planes used cannot be avoided. For example, most of these methods and equipment have located the eye end of these planes by contacting a part of the bony formation immediately under the eyeball. Since there is no definitely identifiable point in this region, the location of either of these planes has necessarily been more or less arbitrary for each individual operator and has accordingly in actual practice been somewhat variable. Further, the placing of a device in a region of the patient's eyes, particularly in the case of children, has been unpleasant to the patient and accordingly, sometimes difficult for the operator to handle with requisite accuracy.

Accordingly, it has been found desirable to locate another plane which is more easily and definitely determinable, which can be located more quickly for a given patient, and which will not be unpleasant nor frightening to the patient; and to provide suitable apparatus for taking measurements from this plane.

Therefore, the major object of my invention has been to provide a method for locating dental formations with respect to a definite and easily determinable reference plane in the patient's head.

A further object of my invention has been to provide a method as aforesaid which can be practiced rapidly, easily and accurately and without undue discomfort or unpleasantness to the patient.

A further object of my invention has been to provide a method as aforesaid which will minimize the necessity for judgement and discretion on the part of the operator and therefore assure greater accuracy and consistency in the final measurements.

A further object of my invention has been to provide apparatus suitable for carrying out a method as aforesaid.

A further object of my invention has been to provide apparatus suitable for carrying out a method as aforesaid, which apparatus will be inexpensive to construct, sturdy, reliable and accurate in operation, and sufficiently versatile to be applicable to a wide range of patients.

Other objects and purposes of my invention will be apparent to those acquainted with method and equipment of this type upon inspection of the accompanying drawings and reading of the following disclosure.

In the drawings:

Figure 1 is a schematic sketch of a patient's head illustrating the plane to be measured.

Figure 2 shows an oblique assembly view of the measuring portion of apparatus suitable for practicing my improved method.

Figure 3 is a plan assembly view of the under side of the mandibular orientation plate.

Figure 4 is a side assembly view of the mandibular orientation plate.

Figure 5 is an oblique assembly view of the measuring device showing a casting table occupying with respect to the head tray the position determined by the mandibular orientation plate.

Figure 6 is a detail of means supporting the impression tray arm holder.

Figure 7 is an oblique detail of one end of the impression tray arm holder.

Figure 8 is a section taken on the line VIII—VIII of Figure 2.

Figure 9 is an oblique detail of another part of the means of holding the impression tray arm.

Figure 10 is a section taken on the line X—X of Figure 2.

Figure 11 is a top plan view of the casting table.

Figure 12 is a section taken on the line XII—XII of Figure 3.

Figure 13 illustrates a pair of alternative, mandibular lateral positioning arms.

Figure 14 is a fragmentary side elevation view of a part of the arms shown in Figure 13 showing the pad at the end thereof.

Figure 15 is a section taken on the line XV—XV of Figure 13.

Figure 16 is a fragmentary plan view of an alternative type of chin pad.

Figure 17 is a fragmentary side elevation view of the chin pad shown in Figure 16.

Figure 18 is a fragmentary detail showing the means gripping the pillar.

Referring now to Figure 1 there is illustrated by the line AC the mandibular plane utilized by the method herein proposed. This plane is preferably determined by one point at the inferior border of the mandible at the notch of the symphysis and by two lateral points located one at each of the notches on the inferior border of the mandible anterior to the protuberances forming the angles in the area of the path of the external maxillary artery. Since each of these points relies upon a specific bone formation, which in each case is covered by relatively little soft tissue and can hence be easily felt and located, the plane will in all cases be easy and definite to determine.

Referring now to Figure 2 the apparatus in general comprises an impression unit 1, a pillar 2, and the mandibular orientation plate 3. The construction of these parts will now be described in more detail.

Construction of the apparatus

A standard impression tray 4 is held by an arm 5 which is received slidably into a holder 6. This holder fits into suitable means 7 for limited universal movement with respect to the pillar 2. While any form of universal joint means may here be used, one successful construction is shown in Figures 6, 7 and 9. Here the slide receiving element 6 has a hollow cylindrical end 8 at each side of which there are arcuate slots 9. This cylindrical part 8 is engaged by the opposed jaws 10 and 11 which are held between the arms 15 and 16 of the yoke 17. The bolt 12 is then passed through suitable openings in said yoke arms, said bolt extending through the slot 9, and is held in place by the wing nut 13 bearing against the washer 14. In this way the arm 6 is permitted to rotate limitedly around its longitudinal axis and also move upwardly or downwardly by limited rotation around the axis of the bolt 12.

The mandibular orientation plate comprises a base plate 20, a right mandibular arm 21 and a left mandibular arm 22. The base plate 20 has sidewardly and forwardly extending parts 24 and 25. At the ends of these parts there are adjustable means 26 and 27 for the pivotal frictional gripping to said parts 24 and 25 of the mandibular arms 21 and 22. While any manually operable gripping means may be used, they may advantageously be the bolt, washer and wing nut assemblies partially shown in the perspective view of Figure 2.

The mandibular arms 21 and 22 each have a straight central slot 28 and 29 encompassing the pivotal portions of the gripping elements 26 and 27 by which the manibular arms may be adjusted forwardly, rearwardly or around said pivot point and then held in adjusted position. At their respective ends 30 and 31 the said manibular arms curve slightly toward each other and to their tips are affixed the contact pads 32 and 33. These plates are relatively small, are slightly rounded at their upper surfaces (Figure 12) and may be fastened to the tips of the manibular arms in any convenient manner. The chin point 23 has a body part 35 (Figure 3) provided with an elongated slot 36 passing on either side of a plate bushing 37 which surrounds the pillar 2 and is affixed to the plate 20. This bushing has a liner 54 which is split at two points about 90° apart, of which that indicated at 55 is one. The upper surface of this bushing is made within close tolerances perpendicular to its axis. A handled screw 39 threads into said bushing to lock same as desired by selectively bearing against said sleeve at a point between the points of slitting. Suitable means 38 are mounted on the base plate 20 and extend through the said slot 36 for the selectable frictional gripping of the said chin point body part to hold it firmly in any selected position with respect to said base plate. The means 38 may, as indicated by the perspective view in Figure 2, be a bolt, washer, and wing nut assembly similar to the corresponding means 26 and 27. Although a slight lateral adjustment should be permitted, in general the means 38 cooperating with the plate bushing 37 surrounding the pillar 2 will hold the chin point against undesirable lateral movement as it is placed into a given adjusted position. From the body part 35 there extends an arm on the end of which is the chin plate 40 (Figures 2, 3, 10) having a slightly curved upper surface similar to that of the pads 32 and 33. The entire construction of this mandibular orientation plate is such that the upper surface of the chin pad 40 together with the upper surfaces of the lateral pads 32 and 33 all lie in the same plane, which plane is perpendicular to the axis of the plate bushing 37. Close manufacturing tolerances are required at this point, for although some variation is permissible the coincidence of said uppermost pad surfaces with a common plane should, for satisfactory results, be held within 0.01 inch.

The clamp 41 is mounted on the pillar 2 immediately above the plate bushing 37 of the manibular orientation plate and comprises any convenient means which may at will be firmly held in a selected position on the pillar 2 and providing an under surface within close tolerances perpendicular to the axis of the pillar 2. As shown in Figure 2 the clamp comprises a split ring 42 surrounding the pillar 2 having arms 43 and 44 extending parallel to each other from each side of the said split ring and threadedly receiving through each of said arms a screw 45 which may be conveniently rotated by a handle 46. Thus, by approximately a one quarter turn of the handle 46 in one way or the other, the clamps may be quickly tightened or loosened to be held in a selected position or moved along the pillar 2 at the will of the operator.

The casting table 50 is shown in Figures 5 and 11. It has a smooth surface of such size and material as will be convenient for receiving the casting material, has an opening 51 extending through the table near one end thereof and said opening is surrounded by a table bushing 52 whose upper surface is perpendicular to the axis of the opening 51. This has a split liner similar to that of the plate bushing 37 and is selectively tightened against the pillar by the thumb screw 54. The surface 50 of the casting table is within close tolerances made perpendicular to the axis of said bushing. Suitable leg supports 53 may be provided if desired, or the table otherwise conveniently mounted so that the pillar 2 may extend through the opening 51 to a point below the working surface of said table and so that said table will be firmly supported for convenient working thereon. The various parts including the table bushing 52 and the plate bushing 37 on the mandibular orientation plate should be arranged to locate the top surface of the plate bushing 37 exactly the same vertical distance from the plane defined by the top surfaces of the end plates 40, 32 and 33 as is the top surface of the table bushing 52 from the working surface of the casting table 50. These parts should be arranged so that with the clamp 41 properly tightened in a selected position on the pillar 2, the plane defined by upper surfaces of the end point pads 32, 33 and 40 will, when the pillar 2 is extending through the opening within the plate bushing 37 and the clamp 41 resting on the upper surface of said bushing will be in exactly the same position with respect to said pillar 2 as is the working surface of the casting table 50 when the pillar 2 is extending through the opening 51 within the table bushing 52 and the clamp 41 in the same selected position on said pillar is resting on the upper surface of said table bushing 52. Thus, with the tray 4 established in a given space relationship with the plane defined by upper surfaces of the end point pads 32, 33 and 40, and all the movable parts properly tightened to hold the various parts in the relative positions determined thereby, the pillar 2 may be removed from its initial position in the opening within the plate bushing 37 and placed into the opening 51 within the table bushing 52 and the tray 4 will then be in exactly the same space relationship with the surface of the table 50 as it was with respect to the determined plane. While, as stated, the plane established by the upper surfaces of the pads should be in the same position with respect to the pillar 2 for any given setting, as is the top of the casting table 50, this is essential only in order that the techniques developed and results obtained by one instrument may be applied to or checked by another instrument. In a single given instrument, any differences existing will cancel themselves out. However, for some special kinds of work it may be desirable to provide a known variation by placing a bushing of known height under the clamp 41 and above the table bushing 52 when the pillar 2 is inserted into the opening 51 of the casting table.

*Operation*

In practicing my improved method with the use of the device above described, the various adjustable parts described are first loosened sufficiently to permit the movement of the several members. The tray 4 separated from the rest of the device and containing a suitable impression material is placed within the patient's mouth and suitably fitted over the teeth of his lower jaw. The tray holder 6 is then adjusted to the arm of the tray and the various parts of the mandibular orientation plate are manipulated to place the chin pad 40 against the flesh covering the inferior border of the mandible at the notch of the symphysis, and the lateral position pads 32 and 33, each on its respective side, tightly against the flesh covering the inferior border of the mandible anterior to the tuberosities located at the angles of the mandible. The various adjustments including that of the clamp 41 are then tightened to maintain the relationships of the parts thus established. At this point, then, there is established by the upper surfaces of the plane determining pads 32, 33 and 40 the location of the selected mandibular plane, and its space relationship to the patient's teeth as located by the tray 4 is definitely fixed. The apparatus may then be removed from the patient. In some cases it will be found convenient to loosen the screw 39 and move the mandibular positioning plate downward slightly to facilitate this removal, and this may be freely done as soon as the said clamp 41 is tightened into place. This makes this removal much easier than the corresponding operation in certain prior known devices and hence for this reason alone my improved method and apparatus are highly advantageous both from the standpoint of the operator and from that of the patient.

With the apparatus removed from the patient the pillar 2 is withdrawn from the mandibular orientation plate and placed into the opening 51 within the table bushing 52, with the bottom surface of the clamp 41 contacting the upper surface of the table bushing 52 or else contacting a spacer placed above said table bushing 52 if desired as above indicated. Thus, the tray 4 occupies, with respect to the surface of the casting table 50, exactly the same space relationship, or a definitely known and controlled variation thereof, as is held by the patient's teeth with respect to his own mandibular plane as selected for reference purposes. A cast may then be formed in the usual manner and the operator will be secure in the knowledge that he is at all times working with respect to a positive and definite reference plane and one which has been exactly measured.

With the lower jaw thus determined the operator can readily make any needed determinations with respect to the upper jaw by conventional methods, so that no difficulties are encountered by transferring the initial reference measurements from the upper jaw as in prior processes to the lower jaw as in my process.

Some operators in working with equipment of the type herein described will prefer to use as the forward reference point the inferior border of the mandible on each side immediately adjacent the notch of the symphysis and for the lateral points the inferior surfaces of the two tuberosities forming, one on each side, the inferior border at the angle of the mandible. When this plane is established the procedure will be the same as above described.

It is also possible to use a combination of the two above described techniques if desired. In doing such, for example, a chin pad of the type shown in Figure 2 could be used with lateral pads of the type shown in Figure 13, and in establishing the mandibular plane, the chin pad will be placed in the notch of the symphysis and the lateral pads placed against the inferior surfaces of the two tuberosities forming the inferior border of the angle of the mandible. Other permutations of these choices will be evident but will not change the nature or the scope of this invention.

I claim:

1. In means for measuring a patient's dental characteristics the combination: a pillar; a denture element establishing a determinable relationship with the dental portion of the patient's lower jaw and held in a selectable position with respect to said pillar as determined by said relationship; a plate slidably associated with said pillar and supporting a plurality of adjustable arms, each of said arms having a contact surface on its upper side; said contact surfaces collectively defining a plane lying between said arms and said denture element.

2. In means for measuring characteristics of dental structure, the combination comprising: a pillar; a denture element establishing a determinable relationship with the dental portion of a patient's lower jaw and means holding same in selectable position with respect to said pillar as determined by said relationship; a plate slidably positioned on the pillar and placed in a plane perpendicular to the axis of said pillar; a collar slidably positioned on said pillar and means associated therewith effecting securing of said collar at any selected point on said pillar; a body part member affixed centrally to said plate for sliding movement in a plane parallel to the plane of said plate and having a chin contact pad at its free end on the upper side thereof; a pair of arms affixed slidably to opposite extremities of said plate for movement in a plane parallel to the general plane of said plate and each having a jaw contact pad on the upper side thereof; the whole being so constructed and arranged that the upper surfaces of said three contact pads lie in the same plane which plane is perpendicular to the axis of said pillar.

3. In means for measuring a patient's dental characteristics the combination: a pillar; a denture element establishing a determinable relationship with the dental portion of the patient's lower jaw and held in a selectable position with respect to said pillar as determined by said relationship; a plate slidably positioned on the pillar and placed in a plane perpendicular to the axis of said pillar, said plate supporting a plurality of adjustable arms, each of said arms having a contact surface on its upper side; said contact surfaces collectively defining a plane lying between said arms and said denture element.

VON K. FROWINE.

REFERENCES CITED

The following references are of record in the file of this patent:

UNITED STATES PATENTS

| Number | Name | Date |
|---|---|---|
| 2,225,274 | MacGoun | Dec. 17, 1940 |

OTHER REFERENCES

P. W. Simon, "A Systematic Diagnosis of Dental Anomalies," 1926, pp. 88, 92, 93, 98, 99.